(12) United States Patent
Sterly et al.

(10) Patent No.: US 7,318,593 B2
(45) Date of Patent: Jan. 15, 2008

(54) STABILIZER BAR AND BUSHING ASSEMBLY

(75) Inventors: Jason Sterly, Belleville, MI (US); John Soronen, Westland, MI (US); Brock Jones, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 10/711,957

(22) Filed: Oct. 15, 2004

(65) Prior Publication Data

US 2006/0082093 A1 Apr. 20, 2006

(51) Int. Cl.
*B60G 21/055* (2006.01)

(52) U.S. Cl. .......................... 280/124.106; 403/232.1; 403/400; 267/189; 267/276; 280/124.107; 280/124.137

(58) Field of Classification Search ................ 267/189, 267/276, 293, 140.12; 280/124.106, 124.13, 280/124.137, 124.152, 124.149, 124.107; 403/232.1, 400, 235

See application file for complete search history.

(56) References Cited

U.S. PATENT DOCUMENTS

| | | | | |
|---|---|---|---|---|
| 2,078,367 A | * | 4/1937 | Boor | .......................... 267/189 |
| 4,143,887 A | | 3/1979 | Williams et al. | |
| 5,224,790 A | | 7/1993 | Hein | |
| 5,352,055 A | | 10/1994 | Hellon et al. | |
| 5,954,353 A | * | 9/1999 | Kincaid et al. | ....... 280/124.152 |
| 6,073,714 A | * | 6/2000 | McHorse et al. | ........ 180/89.14 |
| 6,082,721 A | * | 7/2000 | Kingsley | ..................... 267/276 |
| 6,206,392 B1 | | 3/2001 | Siecinski et al. | |
| 6,318,710 B1 | * | 11/2001 | Anderson et al. | ........... 267/273 |
| 6,439,651 B1 | * | 8/2002 | Johansson et al. | ..... 296/190.07 |
| 6,474,631 B2 | | 11/2002 | Hadano et al. | |
| 6,651,991 B2 | | 11/2003 | Carlstedt et al. | |
| 6,789,812 B2 | * | 9/2004 | Peterson | .............. 280/124.152 |
| 2003/0111817 A1 | * | 6/2003 | Fader et al. | .......... 280/124.166 |
| 2003/0175073 A1 | | 9/2003 | Funke | |

FOREIGN PATENT DOCUMENTS

| | | | |
|---|---|---|---|
| EP | 547945 A1 | * | 6/1993 |
| JP | 64-030937 | | 2/1989 |
| JP | 04046230 A | * | 2/1992 |
| JP | 2001182767 | | 7/2001 |
| JP | 2004210262 | | 7/2004 |

* cited by examiner

*Primary Examiner*—Ruth Ilan
(74) *Attorney, Agent, or Firm*—Frederick Owens; Brooks Kushman P.C.

(57) ABSTRACT

A stabilizer bar assembly for a vehicle suspension system is disclosed. The stabilizer bar assembly has a stabilizer bar that is provided with an annular ring. The annular ring is either formed as an upset or assembled to the stabilizer bar. A bushing having a groove on its inner diameter is assembled to the stabilizer bar at the annular ring that centers the stabilizer bar against transverse displacement. A second bushing is secured to the stabilizer bar at a location spaced from the annular ring. The first and second bushings secure the stabilizer bar to right and left frame rails. The annular ring may have a square, tapered or spherical cross-section.

20 Claims, 4 Drawing Sheets

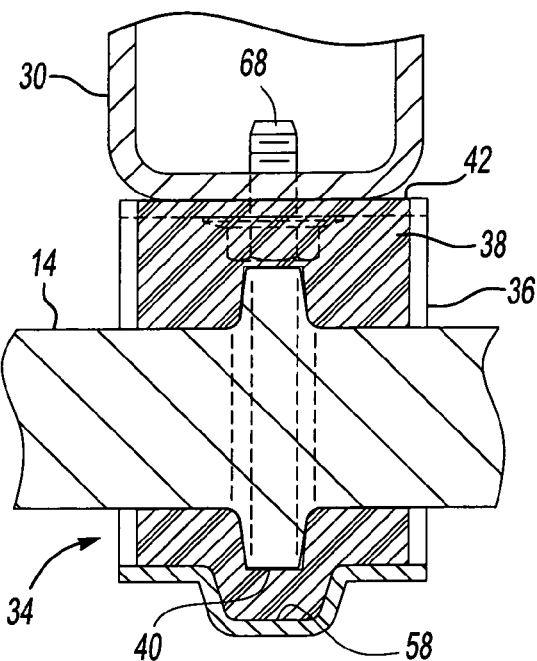
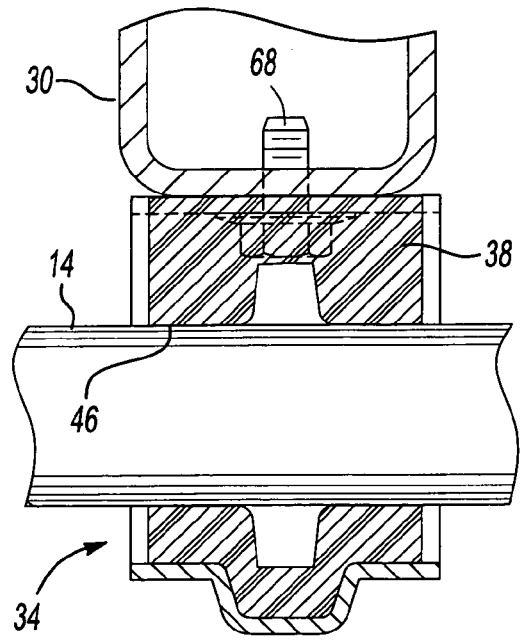
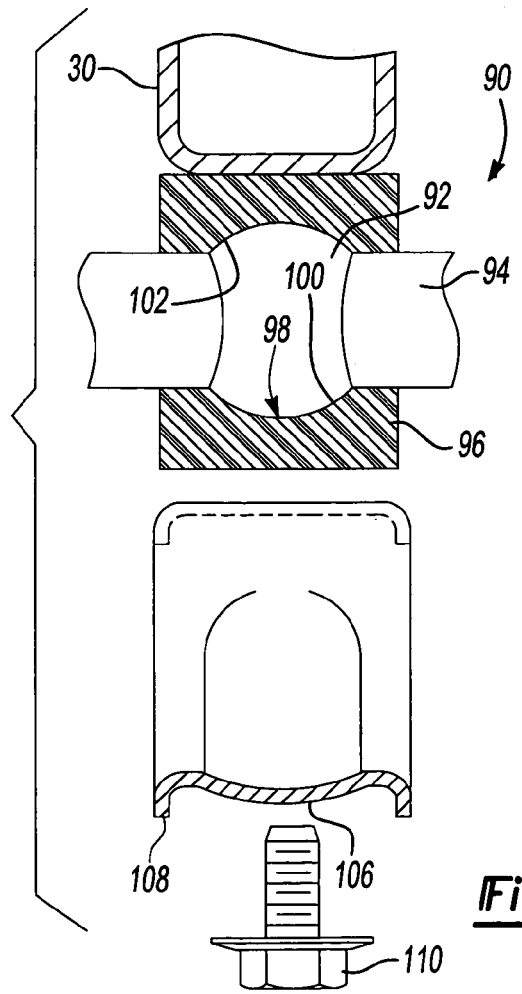
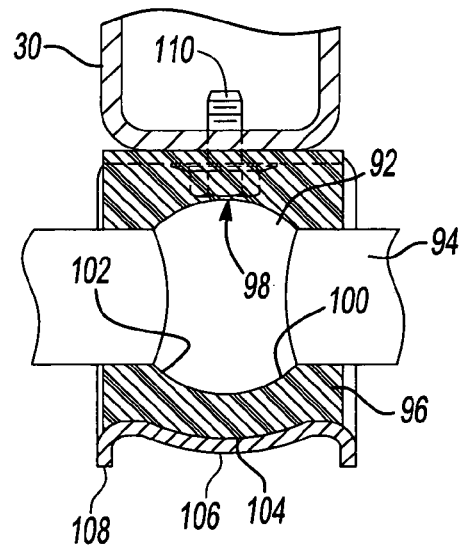

US 7,318,593 B2

STABILIZER BAR AND BUSHING ASSEMBLY

BACKGROUND OF THE INVENTION

1. Field of the Invention

The present invention relates to a stabilizer bar assembly for a vehicle that includes a stabilizer bar and at least one bushing used to attach the stabilizer bar to the vehicle to limit lateral movement.

2. Background Art

Vehicles such as cars, trucks, sport utility vehicles and the like are provided with suspension systems. Vehicle suspension systems support a vehicle on its axles to provide a comfortable ride and improve the handling characteristics of the vehicle. Vehicle suspension systems may include shock absorbers, springs, control arms and stabilizer bars. A stabilizer bar that connects an axle to the frame of a vehicle may be provided for the purpose of limiting or reducing sway. Stabilizer bars also function to reduce transverse jounce or rebound travel from one side of the vehicle to the other. With a stabilizer bar, if one side of a vehicle moves in an upward direction the other side is also pulled up. This facilitates maintaining the vehicle in a substantially level orientation. The stabilizer bar may be connected to the axle by means of a control arm and a link. The stabilizer bar may be connected to the frame of the vehicle by means of bushings.

A recurring problem that confronts vehicle suspension design engineers is that there is a limited amount of space between a vehicle frame and axle to fit suspension components. To compound this problem, the design engineer needs to allow for normal suspension part movement without encountering interference with other chassis components, tires, brakes, and the like. Stabilizer bars tend to be subjected to lateral loading which can lead to lateral movement of the stabilizer bar. Potential lateral movement must be factored into suspension designs. One approach to limiting lateral movement of a stabilizer bar is to add lateral restraint members adjacent to bushings that encircle the stabilizer bar and are secured to the frame by means of brackets. Generally two bushings are preassembled to a straight section of the stabilizer bar and a collar is secured to the stabilizer bar on the straight section next to the bushing. One collar is assembled adjacent to one of the bushings to limit lateral movement to the right while another collar is assembled adjacent to a bushing to limit left hand lateral movement. The collars and bushings are normally preassembled to the stabilizer bar before they are assembled to the vehicle. Vehicle build tolerances require that some space be provided between the collars and the bushings. Typically, a gap of between 6 and 10 millimeters is required to accommodate vehicle tolerance build-up. This gap permits some limited lateral movement without encountering resistance from the bushing. This concept of providing collars adjacent to the bushings is disclosed in U.S. Pat. No. 5,352,055.

Another approach to limiting lateral movement of a stabilizer bar was developed for the 1989 Thunderbird that had upset portions formed on the stabilizer bar and also included bushings that were assembled to the stabilizer bar beside the upset portions. Each upset portion restrained lateral movement in one direction when engaged by its associated bushing. It is believed that during assembly spacing was provided between the bushing and the upset portion to accommodate vehicle assembly tolerances. Such gaps allow some lateral travel of the stabilizer bar without resistance from the bushing.

The present invention is directed to solving the above problems and improving upon prior vehicle suspension system stabilizer bar assemblies. A stabilizer bar assembly is provided that immediately resists lateral movement of the stabilizer bar. In addition, the present invention minimizes the number of parts and potentially reduces vehicle weight, as summarized below.

SUMMARY OF THE INVENTION

According to one aspect of the present invention, a stabilizer bar assembly is provided for a vehicle having an axle assembly and a suspension system for supporting the vehicle on the axle assembly. The stabilizer bar assembly comprises a stabilizer bar having right and left ends that are operatively connected to the axle assembly at spaced locations. The stabilizer bar has an annulus intermediate its ends. A first bushing and a second bushing are provided that each have an inner surface that contacts the stabilizer bar. The bushings have a groove for receiving at least a portion of the annulus and contacting opposite sides of the annulus. A first and second bracket are provided that each contact an outer surface of one of the bushings to secure the first and second bushings and the stabilizer bar to the vehicle at spaced locations.

According to another aspect of the present invention, a stabilizer bushing assembly and a stabilizer bar are provided in combination. The stabilizer bar has a radially outwardly extending protrusion. The bushing assembly includes a bushing having an inner surface that is adapted to engage a stabilizer bar and an outer surface that has a first surface feature. The inner surface of the bushing defines a concavity that has right and left sides that are adapted to engage the protrusion of the stabilizer bar to resist lateral movement of the stabilizer bar relative to the bushing. A bracket engages the outer surface of the bushing and has a second surface feature that engages the first surface feature of the bushing to resist lateral movement of the bushing relative to the bracket.

According to other aspects of the invention, the protrusion or annulus may be a ring integrally formed on the stabilizer bar. The integrally formed stabilizer bar may be formed by heating the stabilizer bar and upsetting the bar in a forming die. Alternatively, the protrusion may be a separately formed ring that is secured onto the stabilizer bar in an assembly operation. The stabilizer bar may be a solid bar or a hollow tubular member.

According to other aspects of the invention, the bushing may have a cross-section that defines a groove to include first and second walls that extend radially outwardly from the inner surface of the bushing so that the first and second walls engage the opposite sides of the annulus or protrusion. Alternatively, the bushing may have a cross-section that defines a groove to include a curved concave wall that extends between two spaced portions of the inner surface of the bushing. The curved concave wall contacts opposite sides of the annulus or protrusion.

According to still further aspects of the invention, a rib may be formed on an outer surface of the bushing and the bracket may have a receptacle portion for receiving the rib. Lateral loads applied to the groove by the annulus are resisted by the bushing and transferred through the rib to the bracket.

These and other aspects of the present invention will be better understood in view of the attached drawings and in light of the detailed description of several embodiments of the invention that is provided below.

BRIEF DESCRIPTION OF THE DRAWINGS

FIG. 5 is a cross-sectional view of a bushing assembled to the stabilizer bar;

FIG. 6 is a fragmentary cross-sectional view of an alternative embodiment of a stabilizer bar bushing and bracket;

FIG. 7 is an exploded perspective view of a stabilizer bar having a spherical ring formed thereon with a bushing and bracket for securing the stabilizer bar to a frame member; and FIG. 8 is a fragmentary cross-sectional view of the stabilizer bar bushing and bracket shown in FIG. 6.

DETAILED DESCRIPTION OF THE PREFERRED EMBODIMENTS

Figure 1:
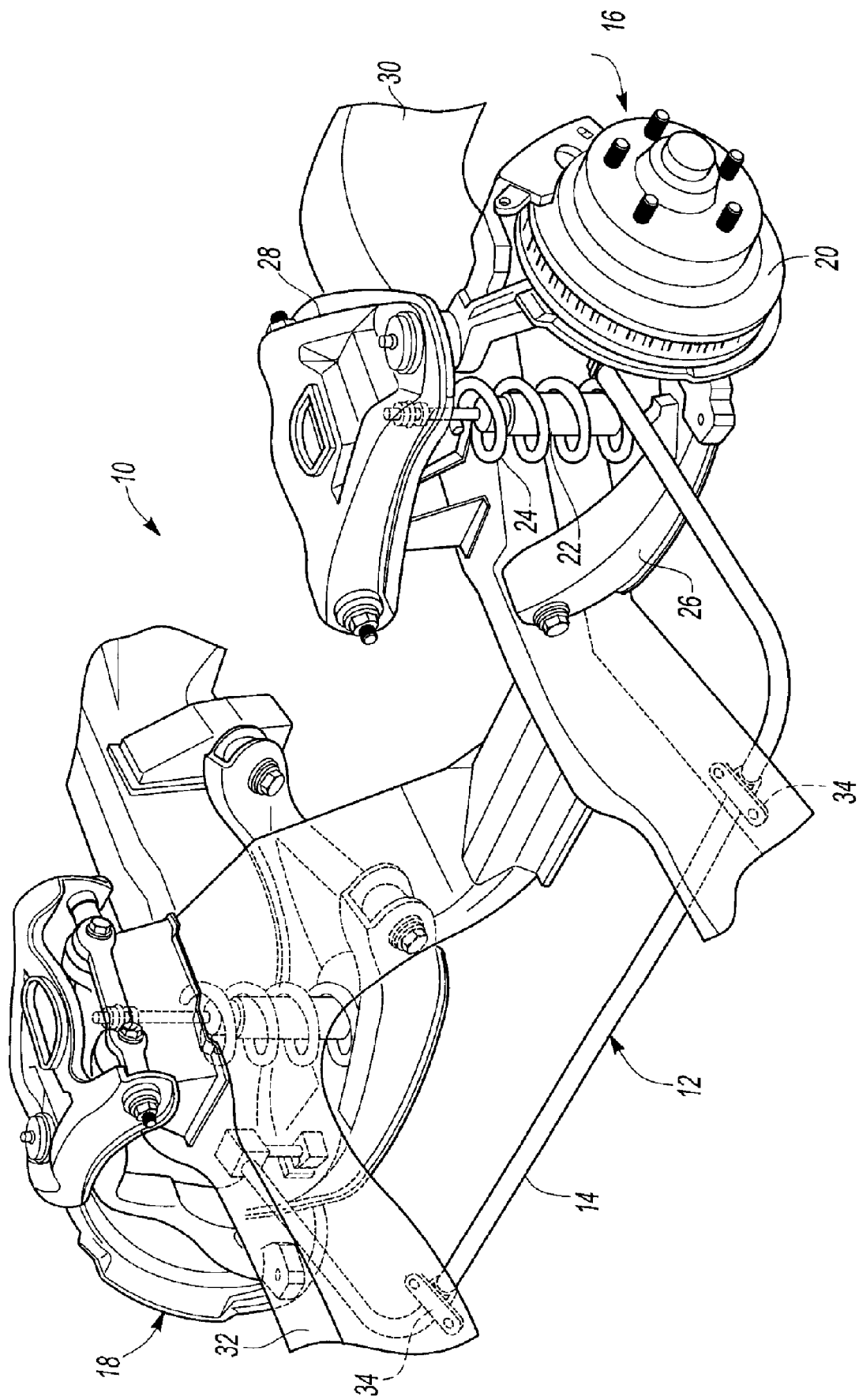
FIG. 1 is a fragmentary perspective view of a front vehicle suspension having a stabilizer bar assembly made according to the present invention.

Referring to FIG. 1, a suspension system 10 for one axle of the vehicle is shown. This application focuses on the stabilizer bar assembly 12 of a suspension system 10. The stabilizer bar assembly 12 has a stabilizer bar 14 that connects a right wheel assembly 16 and a left wheel assembly 18 for the purpose of limiting sway and reducing transverse jounce from one side of the vehicle to the other. Each wheel assembly has a wheel hub 20 to which a vehicle tire (not shown) is attached. A shock absorber 22 and spring 24 connect the wheels to the frame and provide a comfortable ride. An "L" or "A" control arm 26 and an upper control arm 28 connect the wheel assembly to the vehicle frame. The vehicle frame includes a right frame rail 30 and a left frame rail 32. A bushing assembly 34 is secured to each of the left and right frame rails 30 and 32 and form part of the stabilizer bar assembly 12. The bushing assemblies 34 are secured to the stabilizer bar 14 and will be more fully described below.

Figure 2:
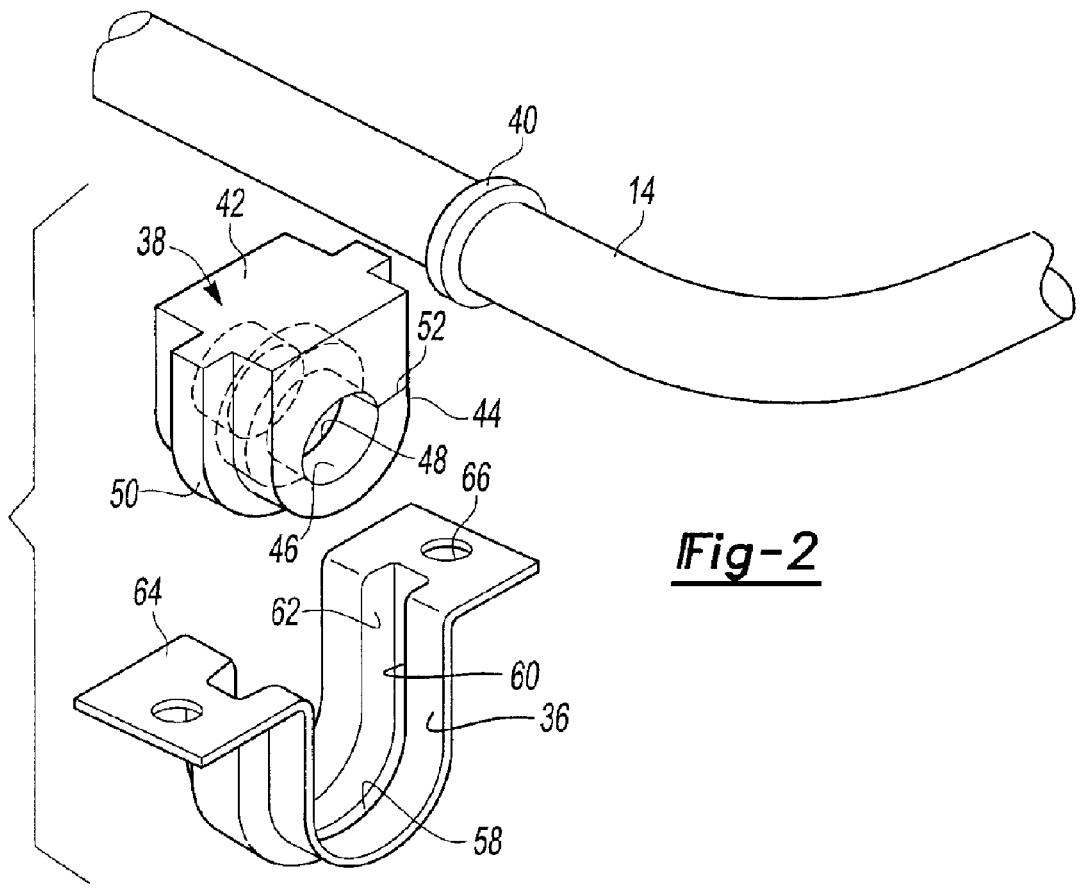
FIG. 2 is an exploded fragmentary perspective view of a stabilizer bar, a bushing and a bracket made according to the present invention.
Figure 3:
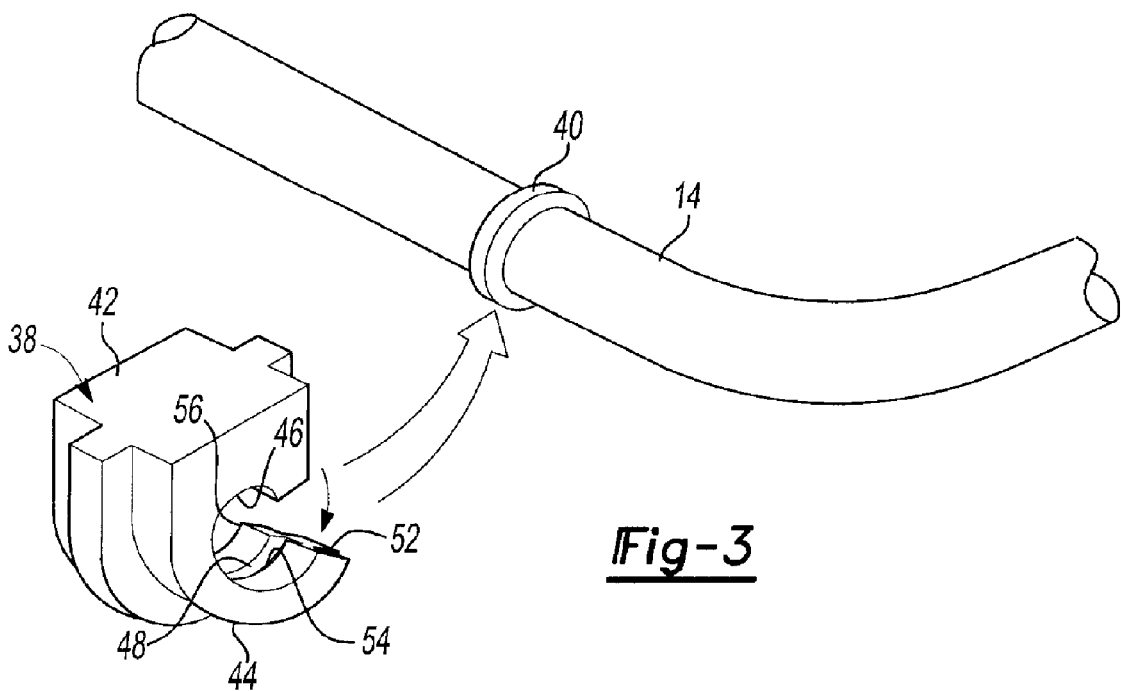
FIG. 3 is a fragmentary perspective view of the stabilizer bar showing the bushing assembled to an annular ring on the stabilizer bar.
Figure 4:
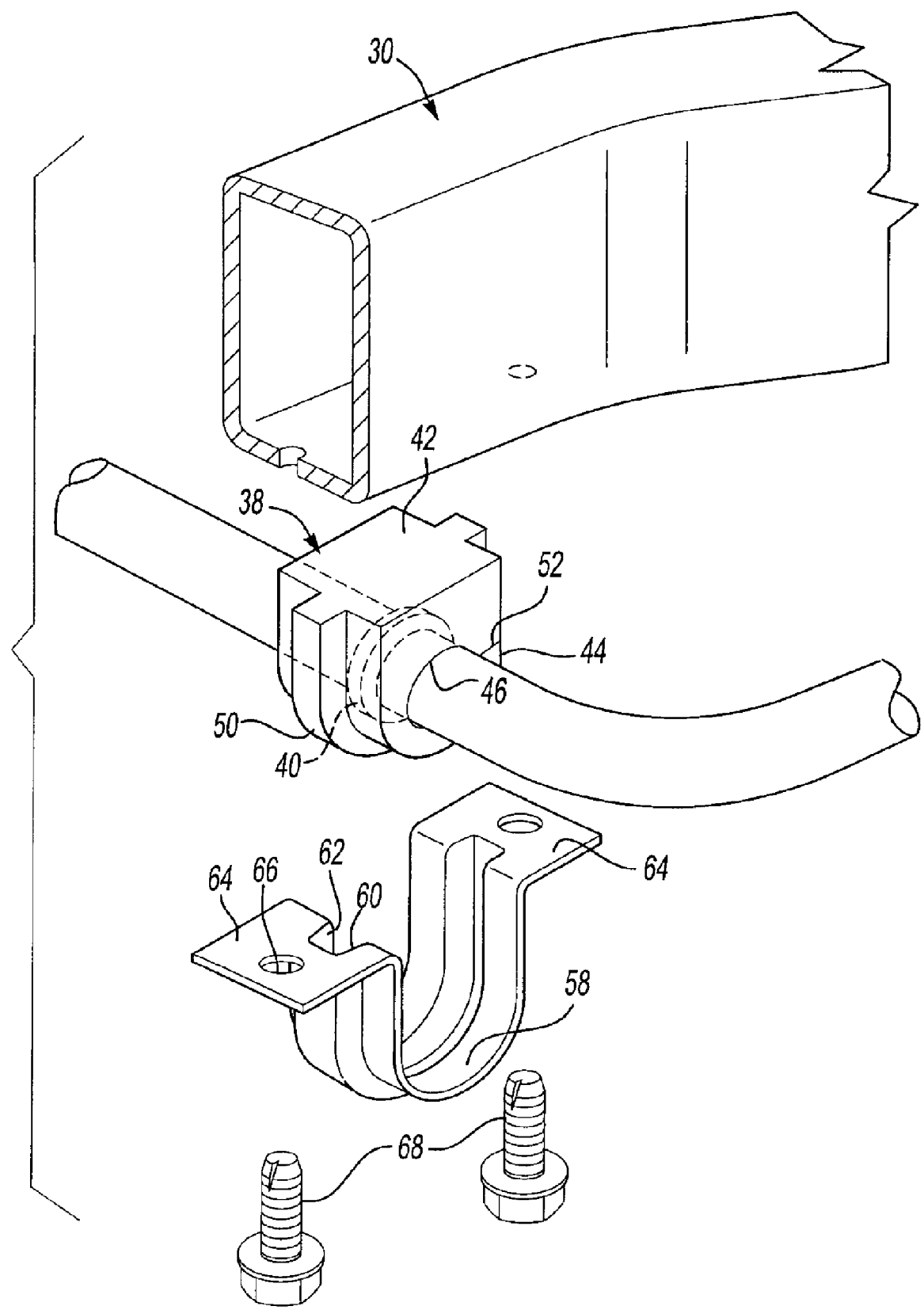
FIG. 4 is a fragmentary exploded perspective view of the stabilizer bar and a frame rail with the bushing assembled to the stabilizer bar and the bracket shown oriented for assembly to the frame member with fasteners.

Referring to FIGS. 2-4, one embodiment of a bushing assembly 34 is described in greater detail. The bushing assembly 34 includes a bracket 36 and a bushing 38. The bushing 38 may be formed of rubber, elastomeric urethane, or the like. The bushing 38 encircles the stabilizer bar 14. One of the bushings also captures an annular ring 40 that is formed on or assembled to the stabilizer bar 14.

The annular ring 40 may be formed by heating the stabilizer bar and upsetting the bar in a forming die. Depending upon the application, only one annular ring 40 may be formed on the stabilizer bar 14. Stabilizer bars may be either solid or tubular. An annular ring 40 may be assembled to the tubular stabilizer bar by crimping or an equivalent assembly technique for tubular stabilizer bars.

The bushing 38 may be a flat base portion 42 and a generally U-shaped outer surface 44. Alternatively, the bushing may be cylindrical or have a different shape. The bushing 38 has a circular inner diameter 46 that includes an annular groove 48. A rib 50 is formed on the outer surface 44 of the bushing 38. A split 52 is provided in the bushing 38 that may extend in a generally radial direction from the exterior of the bushing 38 to the circular inner diameter 46. The bushing 38 is assembled to the stabilizer bar 14 by separating the bushing 38 at the split 52 and sliding the stabilizer bar 14 through the split 52. The bushing 38 is assembled to the stabilizer bar 14 with the annular ring 40 being captured, or restrained, between, a right side 54 and a left side 56 of the annular groove 48. The right side 54 and left sides 54 and 56 function to center the annular ring 40 within the bushing 38 at assembly and during vehicle operation. Forces applied to the stabilizer bar 14 driving it toward the right or left are resisted by one of the sides of the annular groove 48.

The bracket 36 includes a receptacle portion 58 that receives the rib 50 formed on the outer surface 44 of the bushing 38. The receptacle portion 58 has a right inner face 60 and a left inner face 62 that engage the sides of the rib 50. The rib 50 centers the bushing 38 relative to the bracket 36 and retains bushing 38 within the bracket 36. The bracket 36 has flanges 64 with holes 66 for receiving bolts 68 or other fasteners.

Referring to FIG. 5, a bushing assembly 34 is shown attached to a stabilizer bar 14 at a point on the stabilizer bar 14 in such a way that it captures an annular ring 40 within the bushing 38.

Referring to FIG. 6, a bushing assembly 34 is shown secured to a stabilizer bar 14 on a portion of the stabilizer bar 14 that does not have an annular ring. The bushing assembled in this manner retains the stabilizer 14, but does not function to center the stabilizer bar except to the extent that the circular inner diameter 46 of the bushing 38 exerts a frictional grip on the stabilizer bar 14.

Referring to both FIGS. 5 and 6, the stabilizer bar 14 may be conveniently secured to right and left frame rail 30 and 32 to be manufactured without requiring a gap or clearance to accommodate tolerance stack-up. The bushing assembly 34 of FIG. 5 may securely engage the annular ring 40 and center the stabilizer bar relative to frame rail 30. The bushing shown in FIG. 6 may be assembled to the stabilizer bar 14 in a range of locations along the stabilizer bar so that the bolt 68 securing the bushing assembly 34 to the left frame rail 32 will properly align. At least one portion of the stabilizer bar 14 is provided with annular ring 40. The bushing assembly 34 is usable in either mode without requiring the use of two different bushing assemblies 34. There is no need to provide for tolerance stack-up between right and left frame rails 30 and 32. Assembly of the stabilizer bar assembly 12 to the vehicle is unaffected even if the frame rails 30 and 32 are slightly wider apart or narrower than the exact vehicle specifications. The centering function is provided primarily by one bushing assembly 34, while the other bushing assembly 34 still functions to reduce sway and transverse jounce. Since no clearance must be allowed for assembly purposes, improved clearances in the vehicle package may be achieved.

Referring to FIGS. 7 and 8, another alternative embodiment is disclosed that may be referred to as a spherical bushing assembly 90. The spherical bushing assembly 90 engages a spherical upset portion, a surface feature, 92 that is formed on a stabilizer bar 94. A bushing 96 is provided with a concave portion 98 that has a right concave side 100 and a left concave side 102 that engage opposite sides of the spherical surface feature 92. The spherical surface feature 92 is centered within the bushing 96 by the concave groove 98. Right and left concave sides 100 and 102 resist right and left side-to-side displacement of the stabilizer bar 94. A convex rib 104 is provided on the outer surface of the bushing 96 or may be formed when the bushing 96 is received by the concave central portion 106 of the bracket 108. The bracket 108 is assembled to the frame rail 30 by a bolt 110 or other fastener.

The embodiment of FIGS. 7-8 is assembled to the frame of the vehicle as previously described with reference to FIGS. 2-6. Only one spherical surface feature 92 need be provided on the stabilizer bar to accommodate vehicle build tolerances as previously described with reference to the bushing assembly described with reference to FIGS. 2-5.

While the best mode for carrying out the invention has been described in detail, those familiar with the art to which this invention relates will recognize various alternative designs and embodiments for practicing the invention as defined by the following claims.

What is claimed is:

1. A stabilizer bar assembly for a vehicle, the vehicle having an axle assembly and a suspension system for supporting the vehicle on the axle assembly, the stabilizer bar assembly comprises:
    a stabilizer bar having right and left ends that are operatively connected to the axle assembly at spaced locations, the stabilizer bar has one annular ring intermediate the ends;
    a first bushing and a second bushing each having an inner surface that contacts the stabilizer bar, the first bushing having a groove defined within the inner surface, the groove receiving the annular ring and contacting opposite sides of the annular ring to resist lateral movement of the stabilizer bar, wherein the second bushing does not receive an annular ring; and
    a first and a second bracket that each engage an outer surface of one of the bushings to secure the first and second bushings to the vehicle at first and second spaced locations, wherein the location of the first bushing is established based upon the location of the annular ring and the second bushing is attached to the stabilizer bar in a range of locations on the stabilizer bar to accommodate tolerance stack-up and aligned with the second location on the vehicle.

2. The stabilizer bar assembly for a vehicle of claim 1 wherein the annular ring is a ring integrally formed on the stabilizer bar.

3. The stabilizer bar assembly for a vehicle of claim 2 wherein the ring is integrally formed by heating the stabilizer bar and upsetting the bar in a forming die.

4. The stabilizer bar assembly for a vehicle of claim 1 wherein the annular ring is a separately formed ring that is secured onto the stabilizer bar in an assembly operation.

5. The stabilizer bar assembly for a vehicle of claim 1 wherein the stabilizer bar is a solid bar.

6. The stabilizer bar assembly for a vehicle of claim 1 wherein the stabilizer bar is a hollow tubular member.

7. The stabilizer bar assembly for a vehicle of claim 1 wherein the first bushing has a cross-section that defines the groove to include first and second walls that extend outwardly from the inner surface of the bushing, the first and second walls engaging the opposite sides of the annular ring.

8. The stabilizer bar assembly for a vehicle of claim 1 wherein the first bushing has a cross-section that defines the groove to include a curved concave wall that extends between two spaced portions of the inner surface of the bushing, the curved concave wall contacting opposite sides of the annular ring.

9. The stabilizer bar assembly for a vehicle of claim 1 wherein a rib is formed on an outer surface of the first and second bushings and the first and second brackets each have a receptacle portion for receiving one of the respective ribs.

10. The stabilizer bar assembly for a vehicle of claim 9 wherein lateral loads applied to the groove by the annular ring are resisted by the bushing and transferred through the bushing to one of the ribs and, in turn, to the bracket.

11. In combination, stabilizer bushing assembly and a stabilizer bar having an outwardly extending convex protrusion comprising:
    a first bushing having a first inner surface adapted to engage the stabilizer bar and a first outer surface having a first rib, the first inner surface defining a concave recess that has right and left sides that are adapted to engage the convex protrusion on the stabilizer bar to resist lateral movement of the stabilizer bar relative to the bushing;
    a second bushing having a second inner surface adapted to engage the stabilizer bar and a second outer surface having a second rib, wherein the second inner surface engages the stabilizer bar at a location that does not have a protrusion;
    first and second brackets each engaging the outer surfaces of one of the bushings, the brackets each having a receptacle portion that engages the rib of the bushing to resist lateral movement of the bushing relative to the bracket;
    wherein the concave recess of the first bushing defines a concave wall and the protrusion defines a convex outer surface, and wherein lateral loads applied to the concave wall by the convex outer surface of the protrusion are resisted by the first bushing and transferred through the rib to the receptacle portion of the first bracket.

12. The combination of claim 11 wherein the protrusion is a ring integrally formed on the stabilizer bar.

13. The combination of claim 12 wherein the ring is integrally formed by heating the stabilizer bar and upsetting the bar in a forming die.

14. The combination of claim 11 wherein the protrusion is a separately formed ring that is secured onto the stabilizer bar in an assembly operation.

15. The combination of claim 11 wherein the stabilizer bar is a solid bar.

16. The combination of claim 11 wherein the stabilizer bar is a hollow tubular member.

17. The combination of claim 11 wherein the right and left sides of the concave recess engages opposite sides of the protrusion.

18. The combination of claim 11 wherein the right and left sides of the concave recess define a concave wall that extends between two spaced portions of the inner surface of the bushing, the concave wall contacting opposite sides of the protrusion, and wherein the protrusion has a convex outer surface that is engaged by the concave wall of the bushing.

19. The combination of claim 11 wherein the convex outer surface and the concave wall are both partially spherical.

20. A stabilizer bar assembly for a vehicle, the vehicle having an axle assembly and a suspension system for supporting the vehicle on the axle assembly, the stabilizer bar assembly comprises:
    a stabilizer bar having right and left ends that are operatively connected to the axle assembly at spaced locations, the stabilizer bar has one annular ring intermediate the ends;
    a first bushing and a second bushing each having an inner surface that contacts the stabilizer bar, the first bushing having a groove defined within the inner surface, the groove receiving the annular ring and contacting opposite sides of the annular ring, wherein the second bushing is a duplicate of the first bushing and also defines a second groove, wherein the second groove and stabilizer bar form a void around the stabilizer bar when assembled together; and a first and a second bracket that each engage an outer surface of one of the bushings to secure the first and second bushings to the vehicle at first and second spaced locations, wherein the location of the first bushing is established based upon the location of the annular ring and the second bushing is attached to the stabilizer bar at a location on the stabilizer bar that aligns with the second location on the vehicle.

* * * * *